United States Patent [19]

Baheri

[11] Patent Number: 5,132,858
[45] Date of Patent: Jul. 21, 1992

[54] MAGNETIC HEAD POSITIONER

[75] Inventor: Hamid Baheri, Sherman Oaks, Calif.

[73] Assignee: Wangtek, Incorporated, Simi Valley, Calif.

[21] Appl. No.: 790,108

[22] Filed: Nov. 8, 1991

Related U.S. Application Data

[63] Continuation of Ser. No. 715,036, Jun. 11, 1991, abandoned, which is a continuation of Ser. No. 399,229, Aug. 28, 1989, abandoned.

[51] Int. Cl.⁵ .................................................. G11B 5/56
[52] U.S. Cl. ................................................... 360/109
[58] Field of Search ........................................ 360/109

[56] References Cited

U.S. PATENT DOCUMENTS

| | | | |
|---|---|---|---|
| 2,986,607 | 5/1961 | Jacobs | 360/109 |
| 4,087,634 | 5/1978 | Fraser | 360/109 |

Primary Examiner—A. J. Heinz
Attorney, Agent, or Firm—Robbins, Dalgarn, Berlinger & Carson

[57] ABSTRACT

A magnetic head positioning system operates with a lead screw stepper motor assembly and a recording or reading head. The lead screw of the lead screw stepper motor assembly extends through and coaxially with a hollow cylindrical tube. Two slots are provided through the peripheral wall of the tube and extend from one end of the tube towards the second end. A floating nut is shaped to be placed on the lead screw so as to move in a first and second direction as the lead screw is moved in a first and second direction by the motor assembly. The floating nut is provided with two outwardly extending wings, each shaped to fit in one of the slots provided in the tube. A carriage assembly is secured to the head and includes a tubular structure having an inside diameter larger than the outside diameter of the slotted tube. The tubular structure also includes two slots extending from one end toward a second end of the structure. The tubular structure is placed over the slotted tube, floating nut, and lead screw with the wings of the floating nut extending through the slots and with the closed ends of the slots resting against the wings of the floating nut to maintain the head position in dependence upon the position of the lead screw. As the lead screw is moved parallel to the axis of the slotted tube, such movement is transferred to the head.

18 Claims, 2 Drawing Sheets

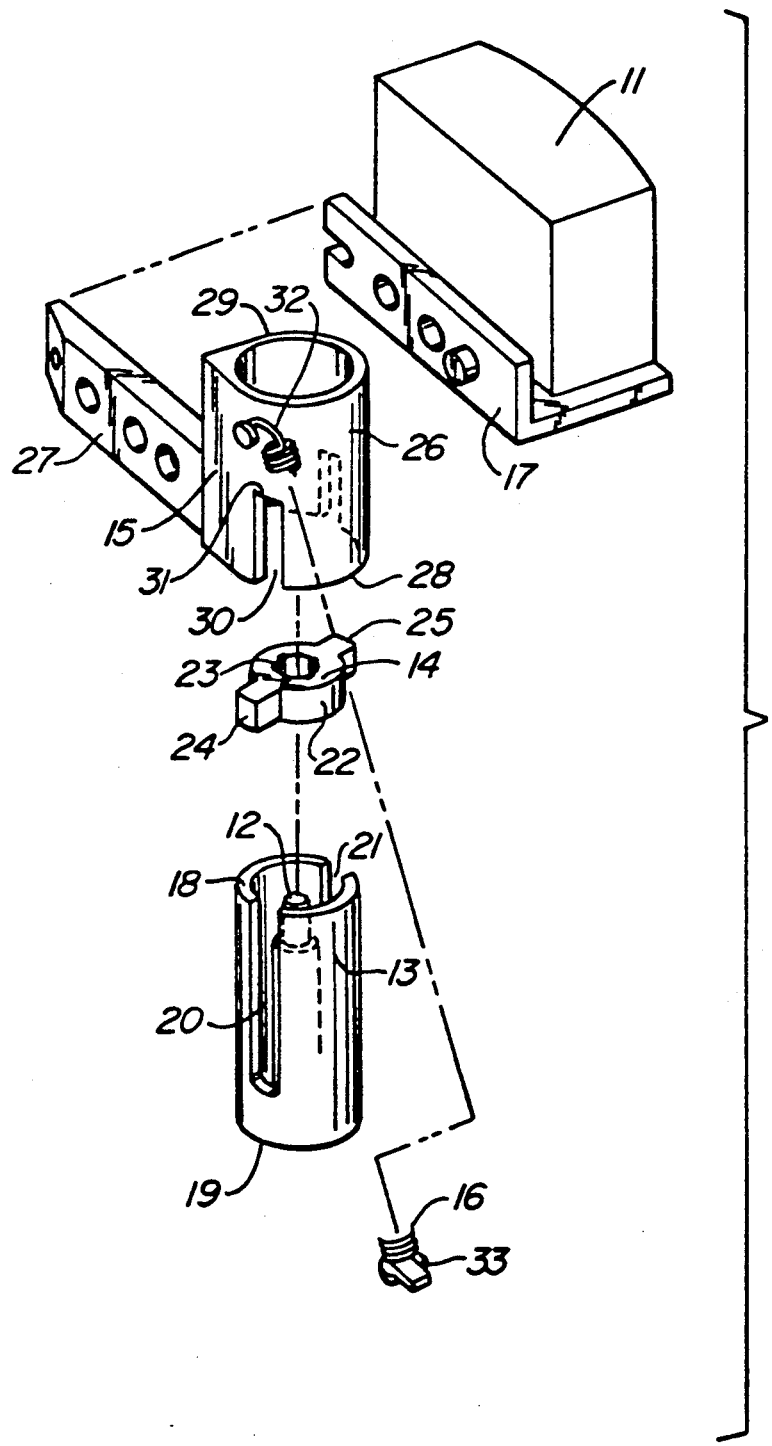
FIG._1.

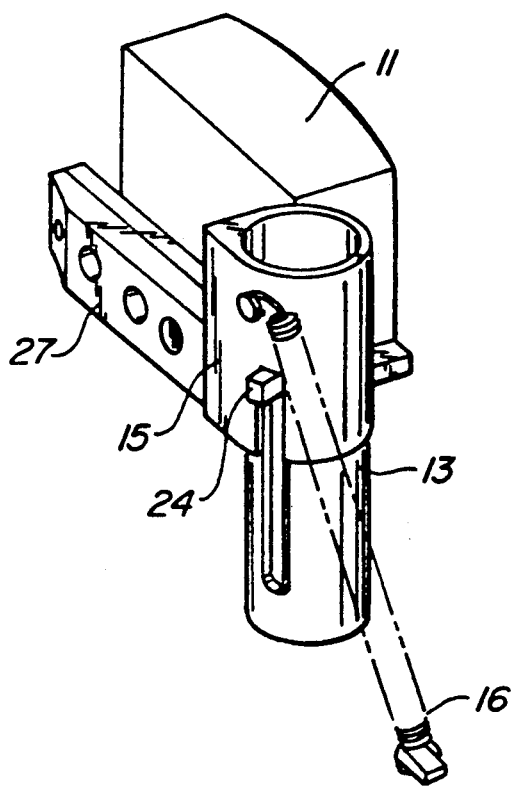
FIG._2.

MAGNETIC HEAD POSITIONER

This application is a continuation of U.S. Ser. No. 07/715,036, filed June 11, 1991, which is a continuation of U.S. Ser. No. 07/399,229, filed Aug. 28, 1989, now both abandoned.

BACKGROUND OF THE INVENTION

1. Field of the Invention

The present invention relates to a positioning device for positioning a magnetic head in a magnetic recording/reading device, such as a magnetic tape drive.

2. Description of Related Art

Several devices for moving and positioning magnetic recording or reading heads with respect to a recording medium, such as a magnetic recording tape, are known in the art. The purpose of such devices is to recording medium. During a recording or a reading operation, relative motion between the head and the recording medium is produced in order to cause a data track provided on the recording medium to pass adjacent the head. As relative motion is produced between the head and the recording medium, perpendicular motions or fluttering of the recording medium with respect to the head can cause a misalignment of the head and the data track on the recording medium. In order to reduce the occurrence of such misalignments, several known recording and reading devices include head positioning systems which operate continuously, or periodically, to reposition the recording or reading head with respect to the recording medium so as to properly align the head with the data track on the recording medium.

Known recording head positioning systems may operate with a sensing system which senses a condition of misalignment between the head and the data track on the recording medium and a drive motor which is operably connected with the recording or reading head for driving the head in a first direction and a second direction opposite to the first direction. An example of a known head positioning system is called the "carriage and way" system. According to the "carriage and way" system, two pins or shafts are arranged adjacent the recording or reading head. A lead screw stepper motor assembly is operably connected to the recording or reading head for moving the head in a first direction or a second direction opposite to the first direction. One of the two pins or shafts operates as a guiding pin for guiding the recording or reading head during movement of such in the first or second direction. The second of the two pins or shafts operates as an anti-rotation barrier for inhibiting rotational movement of the recording or reading head during movement in the first or second direction. In other known systems, the stepper lead screw is used as the anti-rotation barrier.

Such prior head positioning systems, however, exhibit several disadvantages. For example, many such systems are notorious for jamming the positioner. This jamming is primarily due to the relatively large distance provided between the guide pin and the stepper lead screw. Also, these prior systems often require many parts and therefore can be extremely labor intensive to assemble.

SUMMARY OF THE INVENTION

An object of the present invention is to provide a positioning device for positioning a magnetic head with respect to a magnetic recording medium so as to align the magnetic head with respect to a data track provided on the magnetic recording medium.

Another object of the present invention is to provide a magnetic head positioning system which accomplishes the above object and which is relatively simple and inexpensive to manufacture and assemble.

Yet another object of the present invention is to provide a magnetic head positioning system which accomplishes the above objects and which has the capability of aligning the magnetic head with respect to the recording medium with a great degree of accuracy.

These and other objects are accomplished according to the present invention by providing a magnetic head positioning system which operates with a lead screw stepper motor assembly and a recording or reading head. In the illustrated embodiment, the lead screw of the lead screw stepper motor assembly is cylindrical tube. Two slots are provided through the peripheral wall of the tube and extend from one end of the tube towards the second end of the tube. A floating nut is shaped to be placed on the lead screw of the lead screw stepper motor assembly so as to move in a first and second direction as the lead screw is moved in a first and second direction by the motor assembly. The floating nut is provided with two outwardly extending wings, each of which is shaped to fit in one of the slots provided in the tube. A carriage assembly is secured to the head and includes a tubular structure having an inside diameter larger than the outside diameter of the slotted tube. The tubular structure of the carriage also includes two slots extending from one end toward a second end of the structure.

When assembled, the lead screw of the lead screw stepper motor extends inside of the slotted tube. The floating nut is placed on the lead screw with the wings extending through the slots provided in the slotted tube. The tubular structure of the carriage is then placed over the slotted tube, floating nut, and lead screw with the wings of the floating nut extending through the slots of the tubular structure of the carriage. The closed ends of the slots provided on the tubular structure of the carriage rests against the wings of the floating nut, and, in this manner, maintain the head position in dependence upon the position of the lead screw. As the lead screw is moved in a first or second direction, parallel to the axis of the slotted tube, such movement is transferred through the floating nut and the tubular structure of the carriage to the head. The slots provided in the slotted tube act as both a means for guiding the head as it moves in either the first or second direction, and also as a means for prohibiting rotational movements of the head.

BRIEF DESCRIPTION OF THE DRAWINGS

A detailed description of a preferred embodiment will be made with reference to the accompanying drawings, wherein like numerals designate corresponding parts in the several figures.

FIG. 1 shows an exploded view of a head positioning system according to an embodiment of the present invention.

FIG. 2 shows a view of the assembled head positioning system of the FIG. 1 embodiment.

DETAILED DESCRIPTION OF THE DRAWINGS

The following detailed description is of the best presently contemplated mode of carrying out the invention.

This description is not to be taken in a limiting sense, but is made merely for the purpose of illustrating the general principles. The scope of the invention is best defined by the appended claims.

Referring to FIGS. 1 and 2, a magnetic head positioning device 10 is shown as being operable with a magnetic recording or reading head 11 and a lead screw 12 of a lead screw stepper motor (not shown). The magnetic head positioning device 10 comprises a slotted tube 13, a floating nut 14, a carriage assembly 15 and an extension spring 16.

When assembled, the lead screw 12 is arranged within, and extends coaxially with, the slotted tube 13. The floating nut assembly 14 is placed on the lead screw 12 and the carriage 15 is placed over the slotted tube 13, the floating nut 14, and the lead screw 12. The recording or reading head 11 is supported by the carriage assembly 15.

In the illustrated embodiment, the slotted tube 13 comprises a hollow cylindrical structure having a first end 18 and a second end 19. A first slot 20 is provided through the peripheral wall of the hollow cylindrical structure and extends from the first end 18 towards the second end 19 of the cylindrical structure through the peripheral wall of the hollow cylindrical structure at a location on the opposite side of the central axis of the hollow cylindrical structure with respect to the first slot 20.

The floating nut 14 includes a circular shaped body 22 shaped to fit within the hollow portion of the slotted tube 13. The circular body 22 is provided with a circular aperture 23 shaped to receive therein a portion of the lead screw 12 upon insertion of the floating nut within the hollow portion of the tube 13. Extending outward from the circular body 22 is a first wing 24 and a second wing 25. The wings 24 and 25 are shaped and arranged to extend through the respective slots 20 and 21 upon insertion of the floating nut 14 into the hollow portion of the tube 13.

The carriage 15 includes a hollow cylindrical portion 26 and a bracket 27 connected to the cylindrical portion 26. The hollow cylindrical portion 26 of the carriage 15 is provided with a hollow inside diameter which is larger than the outside diameter of the slotted tube 13. The hollow cylindrical portion 26 of the carriage 15 includes a first end 28 and a second end 29. A first slot 30 is provided in the hollow cylindrical portion 26 and extends from the first end 28 towards the second end 29. The first slot 30 includes a slot end 31 located between the first end 28 and the second end 29 of the hollow cylindrical portion 26. A second slot, similar to the first slot 30, is provided in the hollow cylindrical section 26 at a location opposite to the first slot 30 with respect to the central axis of the cylindrical portion 26. The second slot is shown by broken lines in FIG. 1. The second slot in the cylindrical portion 26 is shaped substantially similar to the first slot 30. The hollow cylindrical portion 26 is, thereby, shaped to fit over the hollow tube 13, the floating nut 14, and the lead screw 12, with the wings 24 and 25 of the floating nut 14 extending through the slots 30 provided in the cylindrical portion 26. The slot end 31 of each slot 30 is arranged to abut one of the wings 24 and 25 upon fitting the cylindrical portion 26 over the tube 13.

The bracket 27 of the carriage 15 extends from the outer peripheral surface of the cylindrical portion 26. A tray 17 holding and securing the reading or recording head 11 is adapted to secure to the bracket 27 by any suitable securing means, such as screws, bolts or rivets.

An extension spring 16 has a first end 32 secured to the carriage 15 and a second end 33 secured to a stationary member (not shown). The extension spring 16 is arranged to provide a biasing force on the carriage 15 in the downward direction of FIG. 1. In this manner, the extension spring 16 operates to urge the second end 29 of the cylindrical portion 26 towards the second end 19 of the hollow tube 13. As a result, when assembled, the slot end 31 of each slot 30 is urged against one of the wings 24 and 25 of the floating nut 14. In other embodiments, a torsion spring may be used in place of the extension spring 16.

In operation, the magnetic head positioning device is assembled with the lead screw 12 extending inside and coaxial with the hollow tube 13. The floating nut 14 is placed on the lead screw 12 with the wings 24 and 25 extending through the slots 20 and 21, respectively. The hollow cylindrical portion 26 of the carriage 15 is placed over the hollow tube 13 with the wings 24 and 25 of the floating nut 14 extending through the slots 30. The tray 17 for holding the recording or reading head 11 is secured to the bracket 27 of the carriage 15. The extension spring 16 urges the slot end 31 of each slot 30 against the wings 24 and 25 of the floating nut 14.

As the lead screw stepper motor assembly moves the lead screw 12 in either a first direction or a second direction, parallel to the axis of the tube 13, the floating nut 14 is also moved in the first or second direction. Furthermore, since the slot end 31 of each slot 30 in the cylindrical portion 26 is constantly urged against one of the wings 24 and 25 of the floating nut 14 by the force of the spring 16, the carriage 15 is caused to move in the first or second direction as the lead screw 12 is moved in the first or second direction. As a result, the bracket 27, the tray 17 and the recording or reading head II is also caused to move in the first or second direction.

By virtue of the wings 24 and 25 extending through the slots 20, 21 and 30, the carriage 15 and the tape head 11 are accurately guided during movement thereof in the first or second direction. Furthermore, by maintaining the tube 13 rotationally stationary, rotational movement of the carriage 15 and the head 11 is inhibited due to the wings 24 and 25 extending through the slots 20, 21 and 30. Thus, movement or positioning of the head 11 in the first or second direction, parallel to the axis of the tube 13, can be effected and repeated with great precision and accuracy. Furthermore, with the lead screw 12 arranged coaxial with the hollow tube 13, the adverse effects of torque imparted on the floating nut 14 by the lead screw 12 is minimized. That is, the torque imparted on the floating nut 14 causes both wings 24 and 25 to urge with equal force against an edge of the slots 20 and 21, thereby prohibiting the head 11 from turning.

Since the entire device employs relatively few parts, the manufacture and assembly of the magnetic head positioning device can be performed with relative simplicity. Additionally, the above-described system allows for replacement of the head with relative ease.

The disclosed embodiments are to be considered in all respects as illustrative and not restrictive. The scope of the invention being indicated by the appended claims, rather than the foregoing description. All changes which come within the meaning and range of equivalence of the claims are intended to be embraced therein.

What is claimed is:

1. A magnetic head positioning device operable with an elongated drive member which is drivably movable along a first axis, said device comprising:

a guide member having a hollow portion through which the elongated drive member is arranged for movement along the first axis with respect to said guide member, said guide member having guide means extending substantially parallel to and displaced from the first axis;

transmission means engaging the drive member for movement along the first axis responsive to the movement of the drive member, said transmission means having guide following means for engaging and following said guide means to prevent rotation of said transmission means about the first axis during movement of the drive member; and a movable carriage for supporting the magnetic head, said movable carriage engaging said guide member and said guide following means;

whereby the magnetic head may be driven only along the first axis without rotation by the drive member.

2. A magnetic head positioning device as claimed in claim 1, wherein said guide member comprises a hollow tube structure having a first end and a second end.

3. A magnetic head positioning device as claimed in claim 2, wherein said guide means comprises at least one elongated slot extending from said first end toward said second end.

4. A magnetic head positioning device as claimed in claim 3, wherein said transmission means comprises a floating nut adapted to be supported by the elongated drive member for movement in the first and second directions.

5. A magnetic head positioning device as claimed in claim 4, further comprising supporting means for supporting said movable carriage with said floating nut for movement in the first and second directions.

6. A magnetic head positioning device as claimed in claim 5, wherein said floating nut has at least one wing portion extending therefrom and wherein said supporting means comprises at least one closed ended slot provided in said movable carriage, each of said at least one closed ended slot having a closed end adapted to abut said at least one wing portion.

7. A magnetic head positioning device as claimed in claim 1, further comprising biasing means for urging said closed end of each of said at least one closed ended slot against said at least one wing portion.

8. A magnetic head positioning device as claimed in claim 6, wherein said guide member is stationary.

9. A magnetic head positioning device as claimed in claim 4, wherein said guide following means comprise at least one wing portion extending from said floating nut, said at least one wing portion being shaped to fit into and be guided by said at least one elongated slot in said guide member.

10. A magnetic head positioning device as claimed in claim 9, further comprising supporting means for supporting said movable carriage with said floating nut for movement in the first and second directions.

11. A magnetic head positioning device as claimed in claim 8, wherein said supporting means comprises at least one closed ended slot provided in said movable carriage, each of said at least one closed ended slot having a closed end adapted to abut said at least one wing portion.

12. A magnetic head positioning device as claimed in claim 11, further comprising biasing means for urging said closed end of each of said at least one closed ended slot against said at least one wing portion.

13. A magnetic head positioning device as claimed in claim 11, wherein said guide member is stationary.

14. A magnetic head positioning device for positioning a magnetic head with respect to a magnetic a lead screw stepper motor having a lead screw movable in a first direction and in a second direction opposite to said first direction;

a first hollow cylindrical member arranged about and substantially coaxial with said lead screw, said first hollow cylindrical member having a first end, a second end, and at least one slot extending from said first end towards said second end;

a floating nut shaped to fit within said first hollow cylindrical member and adapted to be supported by said lead screw, said floating nut having at least one outwardly extending wing shaped to extend through said at least one slot provided in said first hollow cylindrical member upon said floating nut being fit within said first hollow cylindrical member;

a second hollow cylindrical member shaped to fit over said first hollow cylindrical member, said second hollow cylindrical member having a first end, a second end, and at least one slot extending from said first end toward said second end, said at least one slot provided in said second hollow cylindrical member having a closed slot end located between said first and second ends of said second cylindrical member;

biasing means for urging said closed slot end of said at least one slot provided in said second hollow cylindrical member against said at least one outwardly extending wing of said floating nut upon fitting said second hollow cylindrical member over said first hollow cylindrical member; and securing means for securing the magnetic head with said second hollow cylindrical member;

wherein movement of said lead screw in said first and second directions is transferred through said floating nut and said second hollow cylindrical member to the magnetic head.

15. A device as claimed in claim 14, wherein said securing means comprises a bracket extending from said second hollow cylindrical member.

16. A device as claimed in claim 14, wherein said biasing means comprises a coil spring having a first end secured to said second hollow cylindrical member and a second end being secured substantially stationary.

17. A device as claimed in claim 14, wherein said biasing means comprises a torsion spring.

18. A device as claimed in claim 14, wherein said first and second hollow cylindrical members are each provided with two slots and wherein said floating nut is provided with two outwardly extending wings shaped to extend through said slots.

* * * * *